US 9,885,318 B2

(12) United States Patent
Green

(10) Patent No.: US 9,885,318 B2
(45) Date of Patent: Feb. 6, 2018

(54) MIXING ASSEMBLY

(71) Applicant: Jason E Green, Davie, FL (US)

(72) Inventor: Jason E Green, Davie, FL (US)

(*) Notice: Subject to any disclaimer, the term of this patent is extended or adjusted under 35 U.S.C. 154(b) by 285 days.

(21) Appl. No.: 14/591,353

(22) Filed: Jan. 7, 2015

(65) Prior Publication Data
US 2016/0195050 A1 Jul. 7, 2016

(51) Int. Cl.
*B01F 5/04* (2006.01)
*B01F 5/06* (2006.01)
*B01F 15/02* (2006.01)
*F02M 21/02* (2006.01)
*B01F 5/00* (2006.01)

(52) U.S. Cl.
CPC ......... *F02M 21/0218* (2013.01); *B01F 5/045* (2013.01); *B01F 5/0451* (2013.01); *B01F 5/0463* (2013.01); *B01F 5/0057* (2013.01); *B01F 5/0614* (2013.01); *B01F 15/0265* (2013.01); *B01F 2005/0025* (2013.01); *B01F 2005/0091* (2013.01); *Y02T 10/32* (2013.01)

(58) Field of Classification Search
CPC ...... B01F 5/0451; B01F 5/045; B01F 5/0057; B01F 5/0614; B01F 5/0616; B01F 2005/0017; B01F 2005/0091; B01F 2005/0627; B01F 2005/0638; B01F 3/0865; B01F 5/0473; B01F 5/0619; B01F 5/0602; B01F 5/0612; B01F 5/0617; B01F 5/06; B01F 15/0265; B01F 5/0045

See application file for complete search history.

(56) References Cited

U.S. PATENT DOCUMENTS 2,058,309 A * 10/1936 Haering ............... G05D 11/006
137/205.5
2,831,754 A * 4/1958 Manka ............... B01D 11/0473
239/404
3,671,025 A * 6/1972 Elliott ................... B01F 5/0413
239/434.5
3,675,901 A * 7/1972 Rion ..................... B01F 5/0451
366/174.1

(Continued)

FOREIGN PATENT DOCUMENTS

CA 2741263 10/2014
WO WO 2002/101214 12/2002

(Continued)

OTHER PUBLICATIONS

Chubb, Peter. 'Roku 3 vs. Apple TV 3G'. product-reviews.net [online]. Sep. 2, 2013 [retrieved Jun. 20, 2016]. Retrieved from the Internet: <URL: http://www.product-reviews.net/2013/09/02/roku-3-vs-apple-tv-3g/>.

(Continued)

*Primary Examiner* — Tony G Soohoo
(74) *Attorney, Agent, or Firm* — Malloy & Malloy, P.L.

(57) ABSTRACT

An embodiment of a mixing assembly for mixing at least two fluids, comprises a housing and an injector body disposed concentrically therein, a vorticing element disposed about the injector body, and a compression element disposed about an outlet of the injector body. The housing is disposed for passage of a first fluid therethrough. The injector body being disposed within the housing and further disposed for the introduction of a second fluid within the flow path of the first fluid.

19 Claims, 11 Drawing Sheets

(56) References Cited

U.S. PATENT DOCUMENTS

| | | | | |
|---|---|---|---|---|
| 3,761,065 | A * | 9/1973 | Rich | B01F 3/0473 261/116 |
| 3,866,781 | A | 2/1975 | Stedman et al. | |
| 3,872,473 | A | 3/1975 | Melgaard et al. | |
| 4,006,852 | A | 2/1977 | Pilsner et al. | |
| 4,078,629 | A | 3/1978 | Kutay et al. | |
| 4,234,922 | A | 11/1980 | Wilde et al. | |
| 4,270,576 | A * | 6/1981 | Takeda | B01F 5/0451 137/888 |
| 4,288,086 | A | 9/1981 | Oban et al. | |
| 4,335,697 | A | 6/1982 | McLean | |
| 4,415,051 | A | 11/1983 | Taylor | |
| 4,442,665 | A | 4/1984 | Fick et al. | |
| 4,444,373 | A | 4/1984 | Hayashi | |
| 4,489,699 | A | 12/1984 | Poehlman | |
| 4,499,885 | A | 2/1985 | Weissenback | |
| 4,522,159 | A | 6/1985 | Engel et al. | |
| 4,527,516 | A | 7/1985 | Foster | |
| 4,535,728 | A | 8/1985 | Batchelor | |
| 4,564,298 | A * | 1/1986 | Gritters | B01F 5/045 137/896 |
| 4,597,364 | A | 7/1986 | Young | |
| 4,603,674 | A | 8/1986 | Tanaka | |
| 4,606,322 | A | 8/1986 | Reid et al. | |
| 4,616,937 | A * | 10/1986 | King | B01F 5/0451 366/336 |
| 4,617,904 | A | 10/1986 | Pagdin | |
| 4,633,909 | A * | 1/1987 | Louboutin | B01F 5/0451 137/888 |
| 4,641,625 | A | 2/1987 | Smith | |
| 4,708,094 | A | 11/1987 | Helmich et al. | |
| 4,753,535 | A * | 6/1988 | King | B01F 5/0451 366/174.1 |
| 4,770,428 | A | 9/1988 | Sugiyama | |
| 4,799,565 | A | 1/1989 | Handa et al. | |
| 4,817,568 | A | 4/1989 | Bedford | |
| 4,861,096 | A | 8/1989 | Hastings | |
| 4,955,326 | A | 9/1990 | Helmich | |
| 5,033,567 | A | 7/1991 | Washburn et al. | |
| 5,050,550 | A | 9/1991 | Gao | |
| 5,054,799 | A | 10/1991 | Fingerle | |
| 5,081,969 | A | 1/1992 | Long, III | |
| 5,092,305 | A | 3/1992 | King | |
| 5,156,230 | A | 10/1992 | Washburn | |
| 5,176,448 | A * | 1/1993 | King | B01F 5/045 366/174.1 |
| 5,215,157 | A | 6/1993 | Teich | |
| 5,224,457 | A | 7/1993 | Arsenault et al. | |
| 5,355,854 | A | 10/1994 | Aubee | |
| 5,356,213 | A * | 10/1994 | Arpentinier | B01F 5/045 366/165.1 |
| 5,370,097 | A | 12/1994 | Davis | |
| 5,375,582 | A | 12/1994 | Wimer | |
| 5,379,740 | A | 1/1995 | Moore et al. | |
| 5,404,711 | A * | 4/1995 | Rajput | F23D 14/02 239/400 |
| 5,518,272 | A | 5/1996 | Fukagawa et al. | |
| 5,526,786 | A | 6/1996 | Beck et al. | |
| 5,546,908 | A | 8/1996 | Stokes | |
| 5,566,653 | A | 10/1996 | Feuling | |
| 5,566,712 | A | 10/1996 | White et al. | |
| 5,593,167 | A | 1/1997 | Barnhardt et al. | |
| 5,598,825 | A | 2/1997 | Neumann | |
| 5,609,037 | A | 3/1997 | Fischler | |
| D384,341 | S | 9/1997 | Hoffman et al. | |
| 5,701,928 | A | 12/1997 | Aoki | |
| 5,735,253 | A | 4/1998 | Perotto et al. | |
| 5,755,210 | A | 5/1998 | Sato et al. | |
| 5,794,979 | A | 8/1998 | Kasuga et al. | |
| 5,806,490 | A | 9/1998 | Nogi et al. | |
| 5,810,309 | A | 9/1998 | Augustine et al. | |
| 5,845,940 | A | 12/1998 | Colburn | |
| 5,937,800 | A | 8/1999 | Brown | |
| 5,996,207 | A | 12/1999 | Brown et al. | |
| 6,003,478 | A | 12/1999 | Huber | |
| 6,027,241 | A * | 2/2000 | King | B01F 3/0873 138/38 |
| 6,041,762 | A | 3/2000 | Sirosh et al. | |
| 6,101,986 | A | 8/2000 | Brown | |
| 6,151,547 | A | 11/2000 | Kumar et al. | |
| 6,168,229 | B1 | 1/2001 | Kooi et al. | |
| 6,200,014 | B1 * | 3/2001 | Babenko | B01F 5/0451 366/167.1 |
| 6,202,601 | B1 | 3/2001 | Ouellette | |
| 6,250,260 | B1 | 6/2001 | Green | |
| 6,250,723 | B1 | 6/2001 | Barberis et al. | |
| 6,276,823 | B1 * | 8/2001 | King | F22G 5/123 366/181.5 |
| 6,289,881 | B1 | 9/2001 | Klopp | |
| D452,693 | S | 1/2002 | Mitchell | |
| 6,422,735 | B1 * | 7/2002 | Lang | B01F 3/0873 366/162.4 |
| 6,513,485 | B2 | 2/2003 | Ogawa et al. | |
| 6,543,395 | B2 | 4/2003 | Green | |
| 6,550,811 | B1 | 4/2003 | Bennett et al. | |
| 6,659,636 | B1 * | 12/2003 | Matula | B01F 3/0865 366/165.1 |
| 6,676,163 | B2 | 1/2004 | Joitescu et al. | |
| 6,718,952 | B2 | 4/2004 | Finch | |
| 6,751,835 | B2 | 6/2004 | Fenton | |
| 6,766,231 | B2 | 7/2004 | Nakagawa et al. | |
| D496,940 | S | 10/2004 | Fetterman | |
| 6,863,034 | B2 | 3/2005 | Kern et al. | |
| 6,875,258 | B2 | 4/2005 | Kuperus | |
| 6,938,928 | B2 | 9/2005 | Pfohl et al. | |
| 7,019,626 | B1 | 3/2006 | Funk | |
| D525,550 | S | 7/2006 | Egidio | |
| D549,721 | S | 8/2007 | Ito et al. | |
| 7,270,209 | B2 | 9/2007 | Suess | |
| D552,121 | S | 10/2007 | Carl et al. | |
| D555,164 | S | 11/2007 | Sergio | |
| 7,299,122 | B2 | 11/2007 | Perkins | |
| 7,334,818 | B2 | 2/2008 | Mascarenhas et al. | |
| 7,341,164 | B2 | 3/2008 | Barquist | |
| 7,410,152 | B2 | 8/2008 | Yates | |
| 7,441,189 | B2 | 10/2008 | Michaels | |
| 7,444,986 | B2 | 11/2008 | Shute | |
| D600,701 | S | 9/2009 | Kase | |
| 7,607,630 | B2 | 10/2009 | Jung et al. | |
| 7,621,565 | B2 | 11/2009 | Ross, Jr. et al. | |
| 7,775,311 | B1 | 8/2010 | Hardy et al. | |
| 7,874,451 | B2 | 1/2011 | Bel | |
| 7,976,067 | B2 | 7/2011 | Naganuma et al. | |
| 7,979,522 | B2 | 7/2011 | Lunsford | |
| 8,055,603 | B2 | 11/2011 | Angell et al. | |
| 8,125,346 | B2 | 2/2012 | Ballard et al. | |
| 8,282,132 | B2 | 10/2012 | Griesbaum | |
| D677,685 | S | 3/2013 | Simmons et al. | |
| 8,408,600 | B2 | 4/2013 | Kondo et al. | |
| D681,670 | S | 5/2013 | Fletcher et al. | |
| D686,244 | S | 7/2013 | Moriya et al. | |
| 8,498,799 | B2 | 7/2013 | Matthews, Jr. et al. | |
| 8,534,403 | B2 | 9/2013 | Pursifull | |
| D691,164 | S | 10/2013 | Lim et al. | |
| 8,550,274 | B2 | 10/2013 | Gerding | |
| 8,556,107 | B2 | 10/2013 | McRobbie et al. | |
| 8,820,289 | B2 | 9/2014 | Green | |
| 8,881,933 | B2 | 11/2014 | Green | |
| 8,882,071 | B2 | 11/2014 | Green | |
| D726,742 | S | 4/2015 | Aoshima | |
| 9,004,744 | B1 * | 4/2015 | Kemp | B01F 5/108 366/167.1 |
| 9,031,763 | B2 | 5/2015 | Green | |
| D732,554 | S | 6/2015 | Tomita et al. | |
| D733,176 | S | 6/2015 | Lin | |
| D748,649 | S | 2/2016 | Kovacevic et al. | |
| D749,617 | S | 2/2016 | Noack et al. | |
| D750,114 | S | 2/2016 | Kettner et al. | |
| D750,120 | S | 2/2016 | Kovacevic et al. | |
| D755,202 | S | 5/2016 | Seo | |
| D759,704 | S | 6/2016 | Kettner et al. | |
| D760,275 | S | 6/2016 | Zhang | |
| 9,394,841 | B1 | 7/2016 | Green | |

(56) References Cited

U.S. PATENT DOCUMENTS

| | | |
|---|---|---|
| D766,942 S | 9/2016 | Napper et al. |
| D768,160 S | 10/2016 | McRae et al. |
| D768,161 S | 10/2016 | McRae et al. |
| D768,661 S | 10/2016 | McRae et al. |
| 2001/0037549 A1 | 11/2001 | Fenton |
| 2002/0017088 A1 | 2/2002 | Dillon |
| 2002/0029770 A1 | 3/2002 | Heffel et al. |
| 2002/0030397 A1 | 3/2002 | Tamura et al. |
| 2002/0078918 A1 | 6/2002 | Ancimer et al. |
| 2003/0178422 A1 | 9/2003 | Kosuge et al. |
| 2003/0187565 A1 | 10/2003 | Wong |
| 2004/0003805 A1 | 1/2004 | Ono |
| 2004/0011050 A1 | 1/2004 | Inoue |
| 2004/0140412 A1 | 7/2004 | Hendzel et al. |
| 2004/0148086 A1 | 7/2004 | Tafazoli et al. |
| 2004/0158086 A1 | 8/2004 | White |
| 2005/0121005 A1 | 6/2005 | Edwards |
| 2005/0230579 A1 | 10/2005 | Mascarenhas et al. |
| 2006/0032532 A1 | 2/2006 | Suess |
| 2006/0033322 A1 | 2/2006 | Suess |
| 2006/0158961 A1* | 7/2006 | Ruscheweyh ......... B01F 5/0451 366/337 |
| 2006/0161315 A1 | 7/2006 | Lewis |
| 2006/0245296 A1* | 11/2006 | Nishioka ............ B01D 53/8631 366/174.1 |
| 2007/0119421 A1 | 5/2007 | Lewis |
| 2007/0277530 A1 | 12/2007 | Dinu et al. |
| 2008/0023957 A1 | 1/2008 | Diehl |
| 2008/0042028 A1 | 2/2008 | Ross et al. |
| 2008/0163627 A1* | 7/2008 | ELKady ................. F23D 14/62 60/737 |
| 2009/0000842 A1 | 1/2009 | Hwang et al. |
| 2009/0152043 A1 | 6/2009 | Lee |
| 2009/0282810 A1 | 11/2009 | Leone |
| 2009/0320786 A1 | 12/2009 | Fisher |
| 2010/0045017 A1 | 2/2010 | Rea |
| 2010/0051567 A1 | 3/2010 | Ross, Jr. |
| 2010/0078244 A1 | 4/2010 | Pursifull |
| 2010/0127002 A1 | 5/2010 | Bel |
| 2010/0263382 A1* | 10/2010 | Mancini ..................... F23R 3/14 60/742 |
| 2011/0087988 A1 | 4/2011 | Ray et al. |
| 2011/0202256 A1 | 8/2011 | Sauve et al. |
| 2011/0209074 A1 | 8/2011 | Gill et al. |
| 2012/0001743 A1 | 1/2012 | Cotten et al. |
| 2012/0060800 A1 | 3/2012 | Green |
| 2012/0067660 A1 | 3/2012 | Kashu et al. |
| 2012/0112533 A1 | 5/2012 | Yarmak et al. |
| 2012/0253641 A1 | 10/2012 | Warner et al. |
| 2012/0296552 A1 | 11/2012 | Matthews, Jr. et al. |
| 2012/0310509 A1 | 12/2012 | Pardo et al. |
| 2012/0325355 A1 | 12/2012 | Docheff |
| 2013/0068905 A1 | 3/2013 | Green |
| 2013/0069357 A1 | 3/2013 | Green |
| 2013/0074816 A1 | 3/2013 | Green |
| 2013/0092694 A1 | 4/2013 | Green |
| 2013/0112768 A1 | 5/2013 | Hagenbuch |
| 2013/0220274 A1 | 8/2013 | Deshpande |
| 2013/0245864 A1 | 9/2013 | Frazier et al. |
| 2013/0284747 A1 | 10/2013 | Rund |
| 2013/0284748 A1 | 10/2013 | Sloan et al. |
| 2013/0336084 A1* | 12/2013 | Janz ...................... B01F 5/0605 366/338 |
| 2014/0053800 A1 | 2/2014 | Steffen et al. |
| 2014/0053816 A1 | 2/2014 | Czapka et al. |
| 2014/0060946 A1 | 3/2014 | Willi |
| 2014/0067236 A1 | 3/2014 | Henry |
| 2014/0196687 A1 | 7/2014 | Coldren et al. |
| 2014/0261301 A1 | 9/2014 | Leone |
| 2015/0000643 A1 | 1/2015 | Green |
| 2015/0020770 A1 | 1/2015 | Green |
| 2015/0025774 A1 | 1/2015 | Green |
| 2015/0142491 A1 | 5/2015 | Webb |
| 2015/0199089 A1 | 7/2015 | Lee et al. |
| 2015/0277750 A1 | 10/2015 | Sakaguchi |
| 2015/0375666 A1 | 12/2015 | Woods |
| 2016/0131007 A1* | 5/2016 | Kauderer .......... B01D 53/9418 422/177 |
| 2016/0162123 A1 | 6/2016 | Kurita et al. |
| 2016/0257196 A1 | 9/2016 | Green |

FOREIGN PATENT DOCUMENTS

| | | |
|---|---|---|
| WO | WO 2008/037175 | 4/2008 |
| WO | WO 2012/036768 | 3/2012 |
| WO | WO 2013/039708 | 3/2013 |
| WO | WO 2013/048812 | 4/2013 |
| WO | WO 2013/058988 | 4/2013 |
| WO | WO 2014/197594 | 12/2014 |
| WO | WO 2016/057239 | 4/2016 |
| WO | WO 2016/065026 | 4/2016 |
| WO | WO 2016/065109 | 4/2016 |
| WO | WO 2016/112156 | 7/2016 |

OTHER PUBLICATIONS

'Testing Windows 8 apps using Visual Studio 2012'. Blogs.msdn.microsoft.com [online]. Aug. 20, 2012 [retrieved Jun. 20, 2016]. Retrieved from the Internet: <URL: https://blogs.msdn.microsoft.com/windowsappdev/2012/08/20/testing-windows-8-apps-using-visual-studio-2012/>.

'WPF How to create a lateral menu like this (Modern-UI)'. stackoverflow.com [online]. Apr. 2, 2014 [retrieved Jun. 20, 2016]. Retrieved from the Internet: <URL: http://stackoverflow.com/questions/22817624/wpf-how-to-create-a-lateral-menu-like-this-modern-ui>.

In-vehicle LPG Bottle with shield dated Oct. 30, 2007 [retrieved from internet dated Nov. 25, 2015] https://commons.wikimedia.org/wiki/File:In-vehicle_LPG_bottle_012.JPG.

GFS Corp., First LNG Mining Truck in U.S. [online press release]. Oct. 21, 2010. Retrieved from the internet on Oct. 25, 2012: http://www.d2ginc.com/PDF/First%20LNG%20Mining%20Truck%20In%20US%20Press%20Kit%20Oct%2021.pdf.

Caterpillar 785C Mining Truck Spec Sheet, 2010.

* cited by examiner

MIXING ASSEMBLY

BACKGROUND OF THE INVENTION

Field of the Invention

The present invention relates to mixing assemblies for the mixing of two fluid flows or streams. More specifically, the present invention relates to mixing assemblies for the mixing of two fluids by the metered injection of one fluid into a flow of the other fluid. Furthermore, the present invention is related to mixing assemblies without moving parts.

Description of the Related Art

A combustion-ignition engine, such as a compression-ignition engine of the type configured to operate on diesel, or other distillate fuel may also be configured to operate on gaseous fuel, such as natural gas, either in lieu of or supplementing the diesel fuel, though such engines are not necessarily manufactured to operate on natural gas. Thus, generally modifications must be made to the engine in order to provide for the introduction of gaseous fuel to the combustion chamber of the engine. One method of introducing gaseous fuel to the combustion chamber may be to mix the gaseous fuel with intake air to create an air-gas mixture, at a point between the air intake and the intake valves, such as in an intake manifold.

In certain scenarios, a high ratio of gaseous to distillate fuel may be desired, such as in scenarios where preservation of the distillate fuel is desired. However, poor mixing of the intake air and gaseous fuel can lead to sub-optimal detonation of the air-gas and distillate mixture. For example, poor mixing can lead to a non-homogenous air-gas mixture, whereby certain regions can have varying concentrations of gaseous fluid, thereby leading to inconsistent detonation characteristics of the air-gas mixture. A fully homogenized air-gas mixture, however, will tend to have predictable and/or uniform detonation characteristics, which allows for a higher proportion of natural gas to be used in the air-gas mixture, while maintaining optimal detonation.

SUMMARY OF THE INVENTION

The present invention is directed toward a mixing assembly for the mixing of at least two fluids. More specifically, the present invention is directed to a mixing assembly capable of mixing the flow of at least two fluids via optimized introduction of a second fluid into the flow of a first fluid. Though particularly described in the embodiments herein as applicable to mixing of gasses for use in an engine, the structural features and advantages of the present invention can be applied to virtually any fluid mixing scenario, and should be understood not to be limited to the present embodiments.

One embodiment of the present invention employs a combination of vorticity and oscillating fluid flow in order to increase the chaotic mixing characteristics of two flows of fluids and thereby enhance the mixing action within and between the two flows of fluids.

By way of example, a housing of the present invention may comprise a substantially cylindrical configuration with open ends configured for the flow of a first fluid, air in one embodiment, therethrough. An intake conduit may be disposed through the sidewall of the housing, the intake conduit being disposed in fluid communication with an injector body that is disposed concentrically within the housing. As such, a second fluid, gaseous fuel in one embodiment, may be communicated through the sidewall, via the intake conduit, and then injected into the flow of the first fluid, via on outlet of the injector body.

As one method of enhancing the mixing of the two fluids, a vorticing element may be disposed within the housing. In at least one embodiment the vorticing element comprises a plurality of angular flow controllers disposed within the flow path of at least the first fluid. In at least one embodiment each of the angular flow controllers comprises a substantially flat, planar member, which is disposed radially about the injector body. Furthermore, each of the plurality of angular flow controllers may be disposed at the same predetermined angle of attack relative to the fluid flow, thereby imparting angular momentum to the first fluid and causing a rotation thereof about the central axis of the housing. Such a flow may be characterized as having vorticity. Inducing vorticity within the flow increases the turbulence of the fluid flow by increasing the amount of lateral mixing between fluid particles, as opposed to substantially laminar flow, in which particles move in substantially parallel lines.

In an additional embodiment, the angular flow controllers may comprise a twisted or helical configuration and be otherwise disposed as substantially disclosed above. The helical flow controller may also be configured such that all angles of attack are present relative to the flow of the first fluid, generating varying amounts of drag on the angular flow controller. Accordingly, turbulent flow of at least the first fluid can then be induced within the housing, even for very low Reynolds numbers, for example, in the range of 100-300, i.e., fluid flow that would otherwise be substantially laminar. Such turbulent flow at such low Reynolds numbers drastically increases the chaotic mixing characteristics of the fluids.

As a further method of enhancing the mixing of the two fluids, which can be combined with the first method, a compression element may be included within the housing and disposed in at least the flow path of the second fluid. In at least one further embodiment, the compression element may comprise a plurality of radial flow controllers disposed in an annular configuration about the outlet of the injector body. In at least one embodiment the radial flow controllers may comprise curved bodies at least partially angled towards the center of the outlet. As such, the radial flow controllers locally compress the second fluid as it leaves the outlet causing the second fluid to expand once it passes the radial flow controllers. Thus the operation of the radial flow controllers can be described as similar to that of a nozzle.

However, unlike a nozzle, the radial flow controllers may be shaped and dimensioned in a predetermined configuration to establish a radially oscillating flow of gaseous fuel. Accordingly, as the gaseous fuel exits the outlet, the radial flow controllers direct the gaseous fuel radially inward, causing a local compression of the gaseous fuel. Due to the "elasticity" of gaseous fuel (or bulk modulus) the gaseous fuel naturally rebounds, and expands in an outward radial expansion, toward the sidewall of the housing. For known flow rates and bulk modulus of gaseous fuels, the radial flow controllers may be dimensioned and configured to establish a radially oscillating flow of gaseous fuel, causing several radial compressions and expansions along the flow. Such radial compressions and expansions enhance the mixing quality of the flow by repeatedly integrating the fluid particles of the second fluid, gaseous fuel, with fluid particles of the first fluid, air.

In certain embodiments the outlet of the injector body may be dimensioned and configured to further enhance the mixing characteristics of the present invention, which may be accomplished by providing an outlet with a main aperture and a plurality of smaller secondary apertures arranged about of proximal inverted cone structure circumscribing the main aperture and a distal conical structure circumscribing the proximal inverted cone structure.

In yet further embodiments the present invention may also include turbulating elements disposed within the housing, and especially downstream of the injector body outlet. The turbulating elements may comprise any of a variety of shapes configured to further disrupt the flow of the fluids thereby increasing turbulence and accordingly increasing the chaotic mixing characteristics of the present invention.

In additional embodiments the present invention may also include structuring configured for the mounting of various hardware modules to the housing. For example, in certain embodiments it may be advantageous to mount or otherwise connect a throttle to the intake conduit for the measured injection of the second fluid thereto. Thus a throttle flange may be disposed on the housing. In certain embodiments the throttle may comprise an integrated throttle unit which may include electronic control of the throttle such as, for example, a WOODWARD brand L-Series Integrated Throttle Valve.

Additional hardware modules may comprise a mass airflow sensor unit which may be mounted to an MAF Unit Flange which incorporates an aperture therein for the passage of the mass airflow sensor therethrough and into communication with the flow of at least the first fluid.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
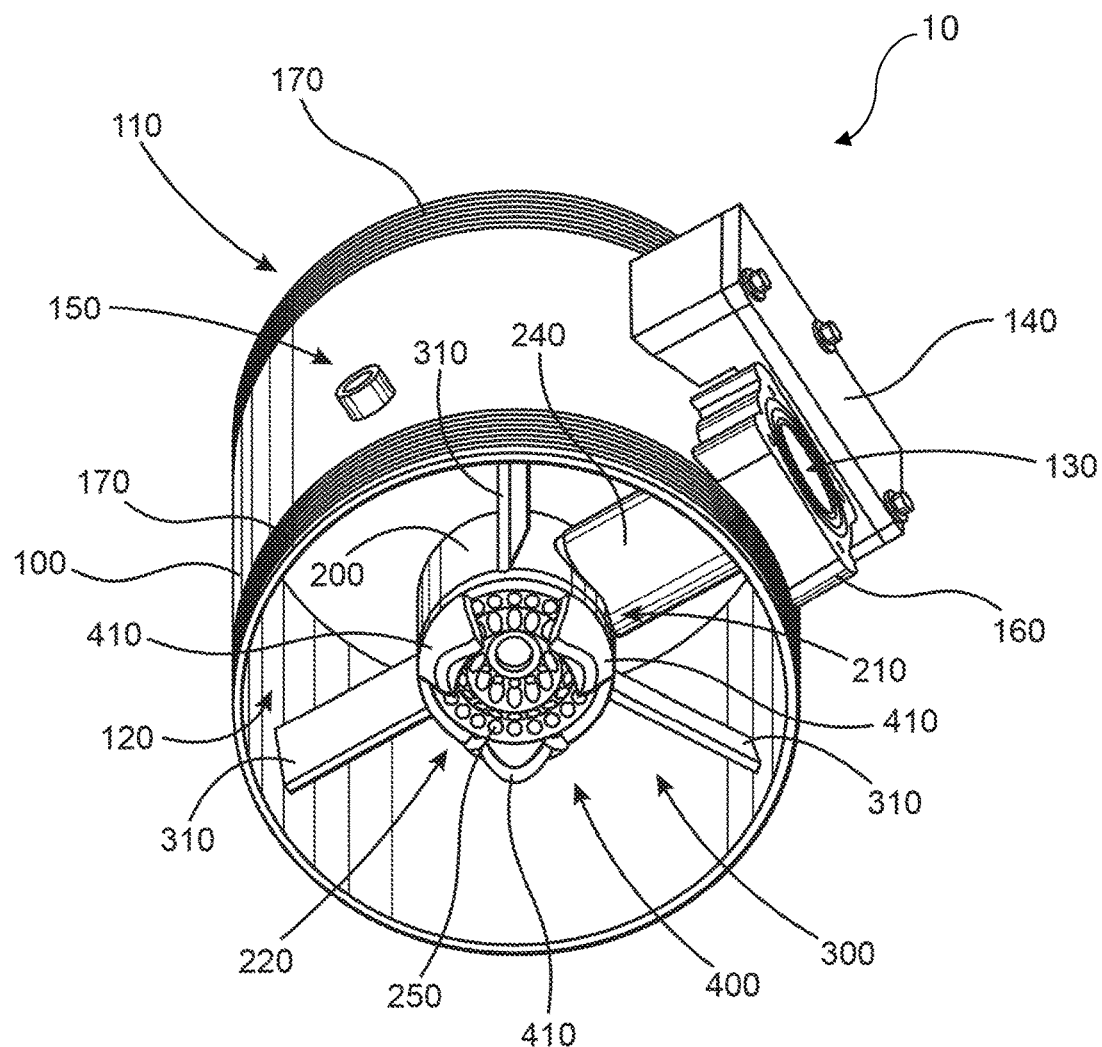
FIG. 1 is a perspective view of a mixing assembly in accordance with one embodiment of the present invention.

With reference to FIG. 1, depicted is a perspective view of a mixing assembly 10 in accordance with one embodiment of the present invention. As can be seen, the depicted embodiment comprises a housing 100 of substantially cylindrical configuration, a sidewall 150 encircling a first open end 110 and a second open end 120. In the depicted embodiment, the housing 100 may be disposed within the path of an engine air intake such that ambient air, or a first fluid, to be directed to the combustion chamber of the engine flows through the housing 100 by passing into the first open end 110 and out of the second open end 120.

As can also be seen in FIG. 1, an injector body 200 is disposed substantially within the flow of the first fluid in order to inject a second fluid within the flow path of the first fluid. In certain embodiments the second fluid may comprise a gaseous fuel such as natural gas, but the present invention is not limited to such second fluids. The second fluid may be introduced into the injector body 200 via a second fluid intake aperture 130 disposed within the sidewall 150. An intake conduit 240 may be disposed in fluid communication with the second fluid intake 130 as well as an inlet 210 of the injector body and serve to conduct the second fluid thereto. Once within the injector body 200, the second fluid may then be introduced into the flow path of the first fluid by exiting an outlet 220 of the injector body 200, which in the depicted embodiment includes a diffuser 250, which will be discussed in detail further below. It will be appreciated by those skilled in the art that the transfer of second fluid through the second fluid intake 130, along the intake conduit 240, into the injector body 200, and out of the outlet 220 may be accomplished via a positive pressure therein. For example, a second fluid may be stored in a second fluid source under pressure greater than that of the pressure within the housing, and furthermore, may be actuated via a throttle disposed in communication with the second fluid source and second fluid intake 130.

Figure 11:
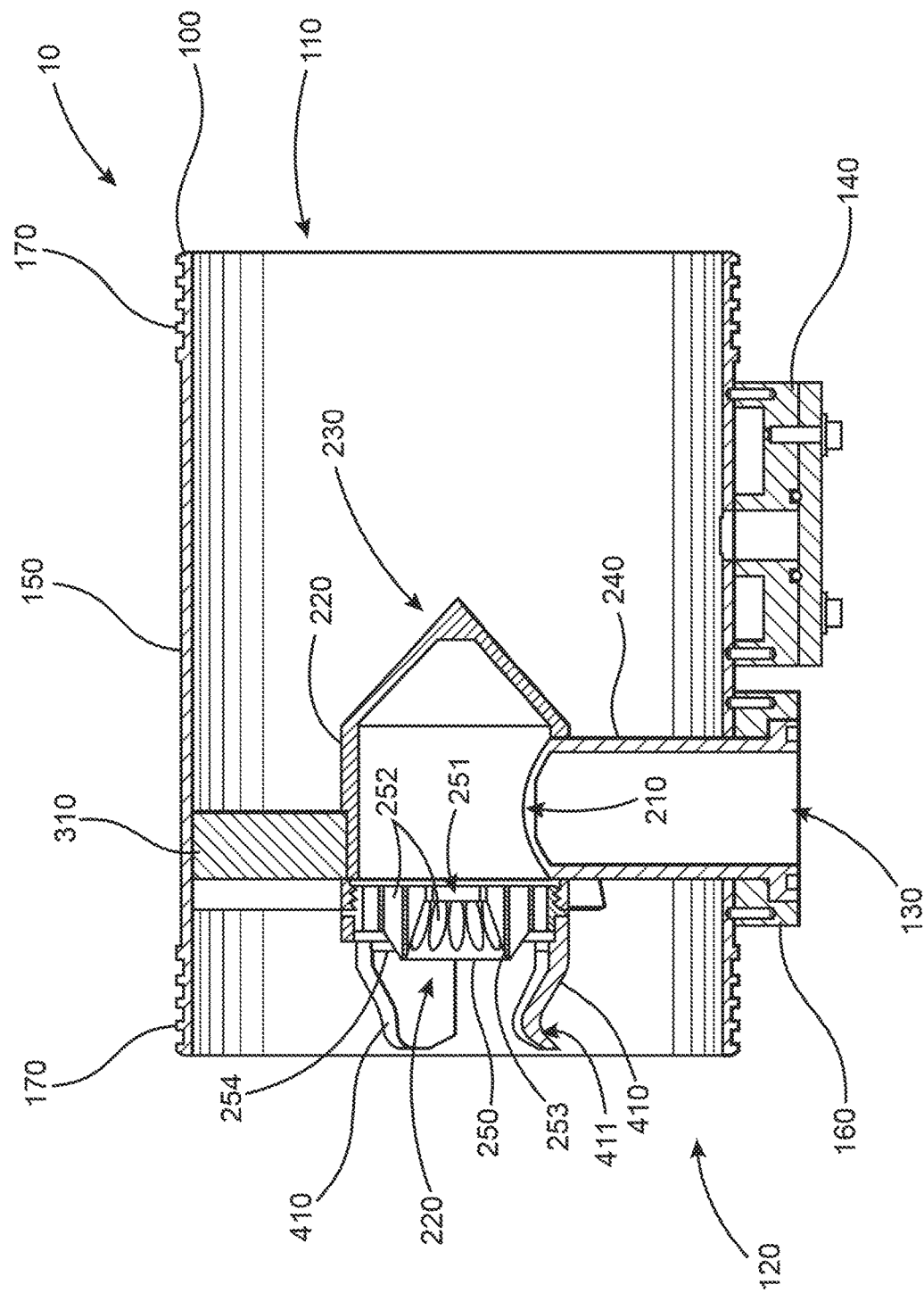
FIG. 11 is a section plan view of a mixing assembly in accordance with the embodiment of the present invention depicted in FIG. 1.

The flow path of the first fluid and second fluid is more clearly depicted in FIG. 11, which is a section view of the embodiment of FIG. 1. In at least some embodiments the mixing assembly 10 will be disposed within the path of a combustion engine air intake. As such, a first fluid will generally enter the housing 100 at the first end 110 and exit the housing 100 at the second end 120. Additionally, a throttle body may be attached in communication with the second fluid intake 130 in metering relation thereto. Thus, the second fluid may enter the mixing assembly through the second fluid intake 130, travel along the intake conduit 240, through the inlet 210 of the injector body 200, and then through the outlet 220 of the injector body 200 into the stream of the first fluid flowing past the outlet 220 of the injector body 200. As can be seen, additional structuring, such as a diffuser 250, radial flow controllers 410, angular flow controllers 310, etc. may be disposed within the housing 100 to facilitate and/or enhance the mixing of the first and second fluids. Such additional structuring will now be disclosed in detail.

Now returning to FIG. 1, depicted therein is one embodiment of a vorticing element 300 in accordance with one embodiment of the present invention. The depicted embodiment comprises three angular flow controllers 310 disposed in a radially oriented configuration about the injector body 200 at approximately 120 degree intervals and further, connecting the injector body 200 and the sidewall 150. The depicted embodiment of the angular flow controllers 310 comprise substantially planar members that are rotated to form an acute angle with respect to a central axis of the housing 100 that is perpendicular to the first end 110 and second end 120. In at least one embodiment the angle formed with respect to the central axis is on the order of 0.01 to 10 degrees. Furthermore, in the depicted embodiment, each angular flow controller 310 is rotated in the same direction so as to redirect the first fluid to create a rotational flow of first fluid about the central axis of the housing 100. Such a flow may be characterized as having vorticity.

Also depicted in FIG. 1 is one embodiment of a compression element 400. As depicted, the compression element 400 comprises a plurality of three radial flow controllers 410 disposed in an annular configuration about the outlet 220 of the injector body 200 at approximately 120 degree intervals. The depicted embodiment of each of the radial flow members 410 comprises a member including at least one surface that curves toward the central axis of the housing 100, thus directing the second fluid toward the central axis of the housing 100. As such, when a second fluid exits the outlet 220 it is locally compressed by the radial flow controllers 410 as the curved configuration forces the particles of secondary fluid to travel radially inward causing a radial compression of secondary fluid. Upon passing the radial flow controllers 410 the secondary fluid may naturally rebound and radially expand, causing particles of secondary fluid to travel towards the sidewall 150, thereby intermingling with particles of first fluid. Furthermore, the radial flow controllers 410 may be curved in a radially outward configuration, at a distal portion, in order to encourage such radial expansion of second fluid particles. One example of such a radially outward configuration is referenced as distal portion 411 in FIG. 11.

For a given second fluid, such as gaseous fuel, certain characteristics of the gaseous fuel can be determined such as the bulk modulus of the gaseous fuel, as well as velocity, pressure, temperature, etc., at which the second fluid may exit the outlet 220, among other quantities. The specific configuration, dimensions, and or shape of the radial flow controllers 410 may then be predetermined to cause oscillations of radial compressions and expansions within the second fluid. Such oscillations will then cause further integration of the second fluid particles with first fluid particles thereby enhancing the mixing characteristics of the present invention.

Figure 2:
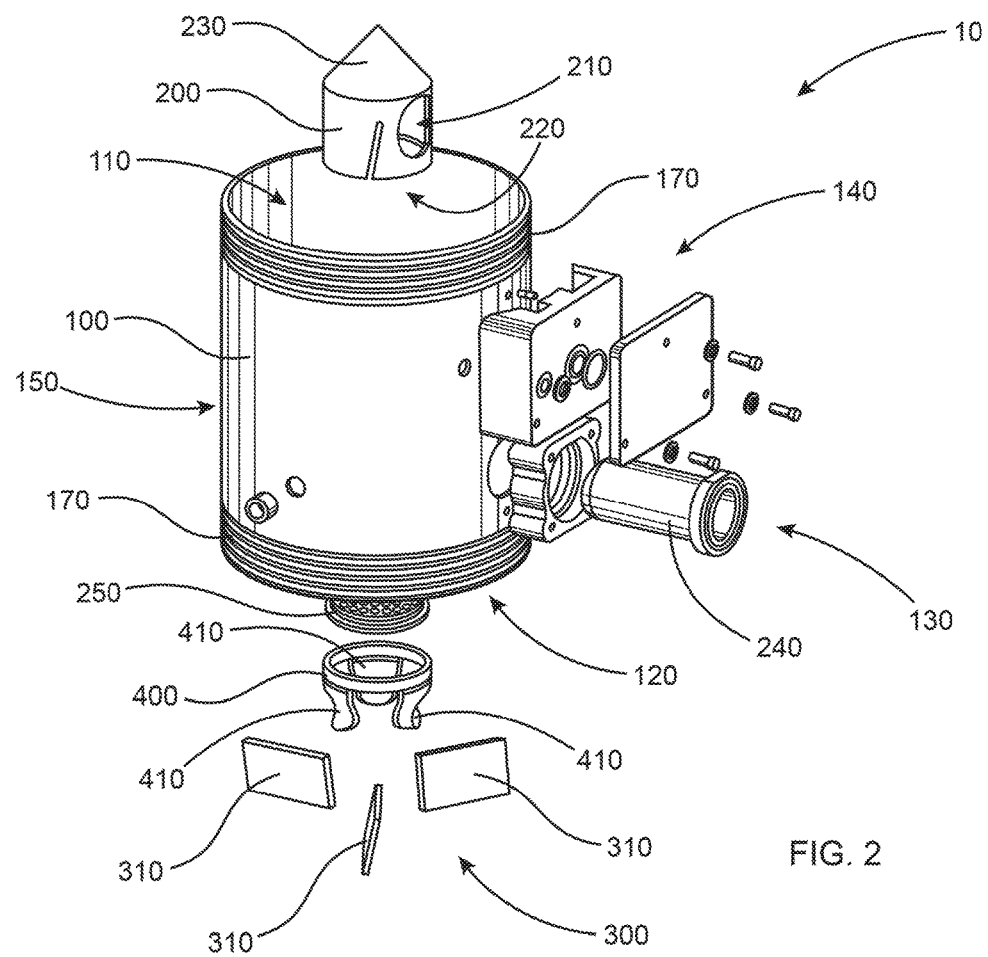
FIG. 2 is an exploded view of a mixing assembly in accordance with one embodiment of the present invention.

Now with reference to FIG. 2, depicted is an exploded view of a mixing assembly 10 in accordance with one embodiment of the present invention. The depicted embodiment represents but one of a variety of methods to manufacture and/or assemble the present invention. In the depicted embodiment, the housing 100 includes mounting surfaces 170 disposed on the sidewall 150 at each of a first open end 110 and a second open end 120. In at least one embodiment, the mounting surface 170 comprises ridges within the surface of the sidewall 150 which may serve to increase friction between the sidewall 150 and a hose or pipe disposed about either the first open end 110 or second open end 120. Furthermore, such a hose or pipe may be further secured to the housing 100 via adhesive compound or a hose clamp, for example. In further embodiments the mounting surface 170 may comprise threads.

Figure 5:
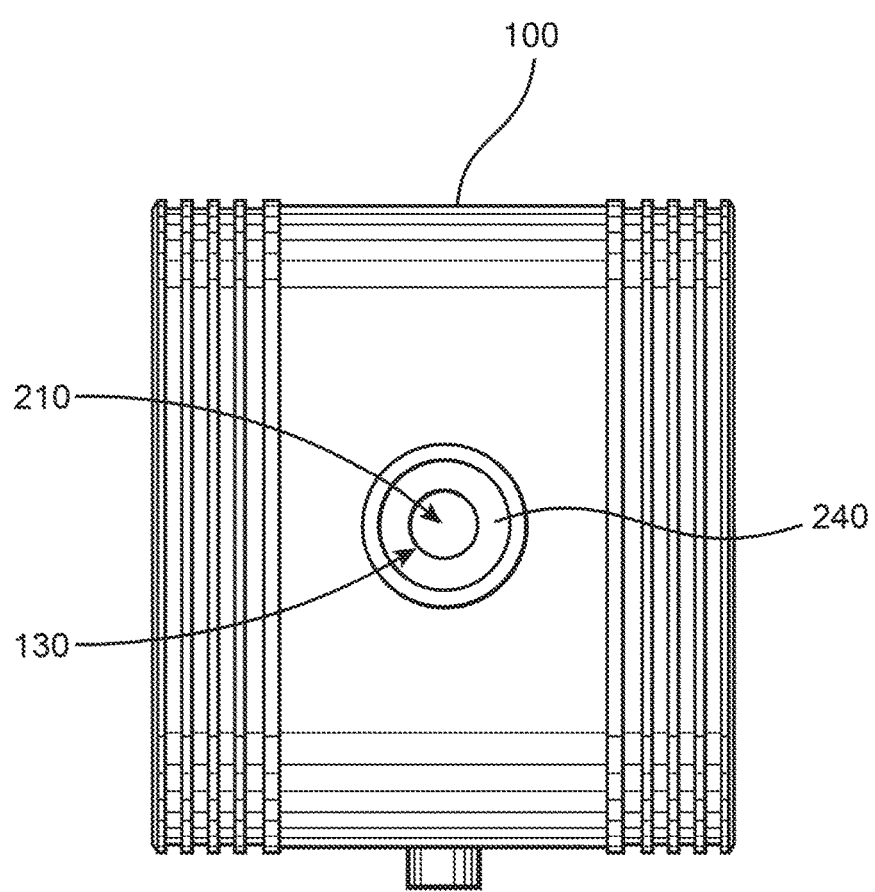
FIG. 5 is a side plan view of a mixing assembly in accordance with one embodiment of the present invention.

Additionally, depicted in FIG. 2 is one embodiment of an injector body 200 in accordance with one embodiment of the present invention. The depicted embodiment of the injector body 200 comprises a substantially cylindrical configuration with an inlet 210 in the sidewall, an outlet 220 at one end, and a conical closed end 230 opposite the outlet 220. It will be appreciated that the closed end 230 is not required to be conical in form but, that some configuration which provides aerodynamic benefits may be desired. When the present invention is assembled, the intake inlet 210 is disposed in fluid communication with the second fluid intake 130 via the intake conduit 240 (see FIG. 5 for an additional view). Additionally, as can be seen, each element of the present invention, such as the injector body 200, diffuser 250, compression element 400, etc. are formed individually and then joined as an assembly. It will be appreciated that any combination of elements of the present invention may be formed unitarily, as a single piece. By way of example, each element depicted in FIG. 2 may instead be formed unitarily via additive manufacturing techniques, for example, such that the entire mixing assembly 10 is comprised of a single, unitary piece.

Figure 3:
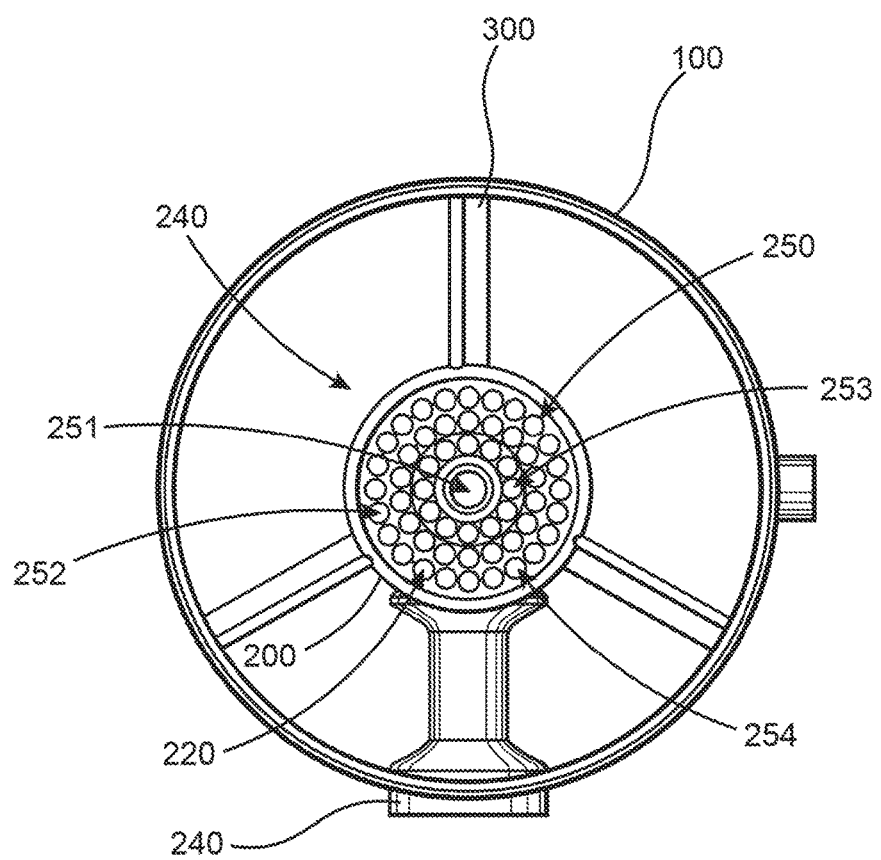
FIG. 3 is a front plan view of a mixing assembly in accordance with one embodiment of the present invention.
Figure 4:
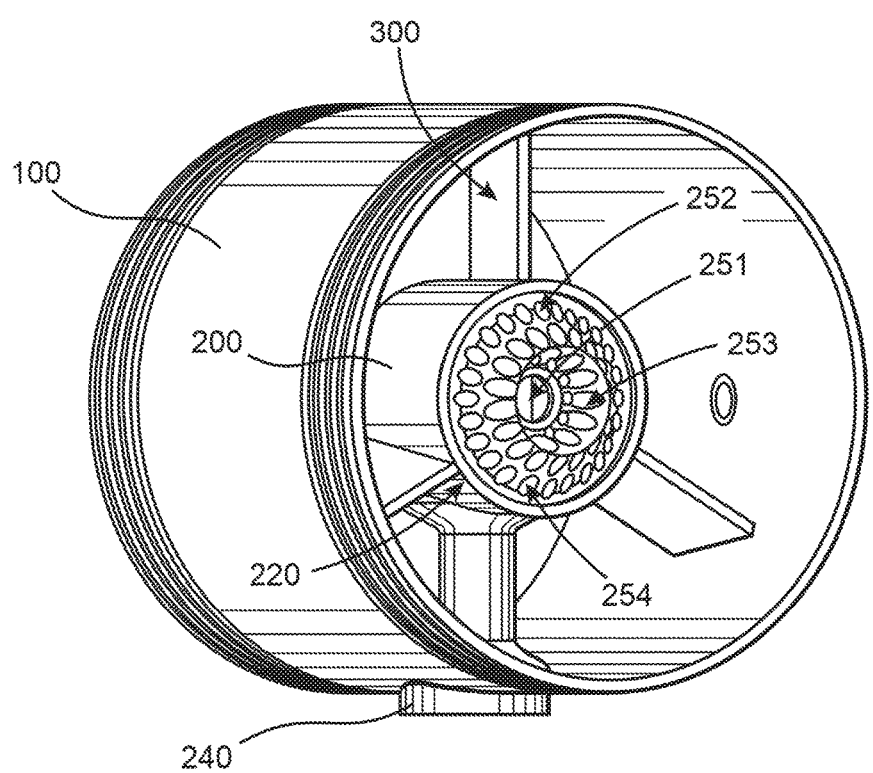
FIG. 4 is a perspective view of a mixing assembly in accordance with one embodiment of the present invention.

FIGS. 3 and 4 present a mixer assembly in accordance with one embodiment of the present invention. The depicted embodiment does not include a compression element 400 which for the purposes of the present application more clearly depicts the structure of the diffuser 250. As can be seen therein, the diffuser 250 is disposed in flow controlling relation to the second fluid exiting the outlet 220 of the injector body 200 and comprises a perforated configuration, including a plurality of apertures therethrough. The depicted embodiment of the diffuser 250 includes a main aperture 251 and a plurality of smaller, secondary apertures 252 disposed concentrically about the main aperture 251. This configuration enhances the mixing characteristics of the present invention relative to an outlet 220 without a diffuser 250.

Additionally, as depicted in FIGS. 3 and 4, the diffuser 250 further comprises a proximal, inverted conical structure 253 disposed concentrically about the main aperture 251 as well as a distal, conical structure 254 disposed concentrically about the proximally, inverted conical structure 253. This configuration enhances the mixing characteristics of the present invention relative to a diffuser 250 without such structure.

Figure 6:
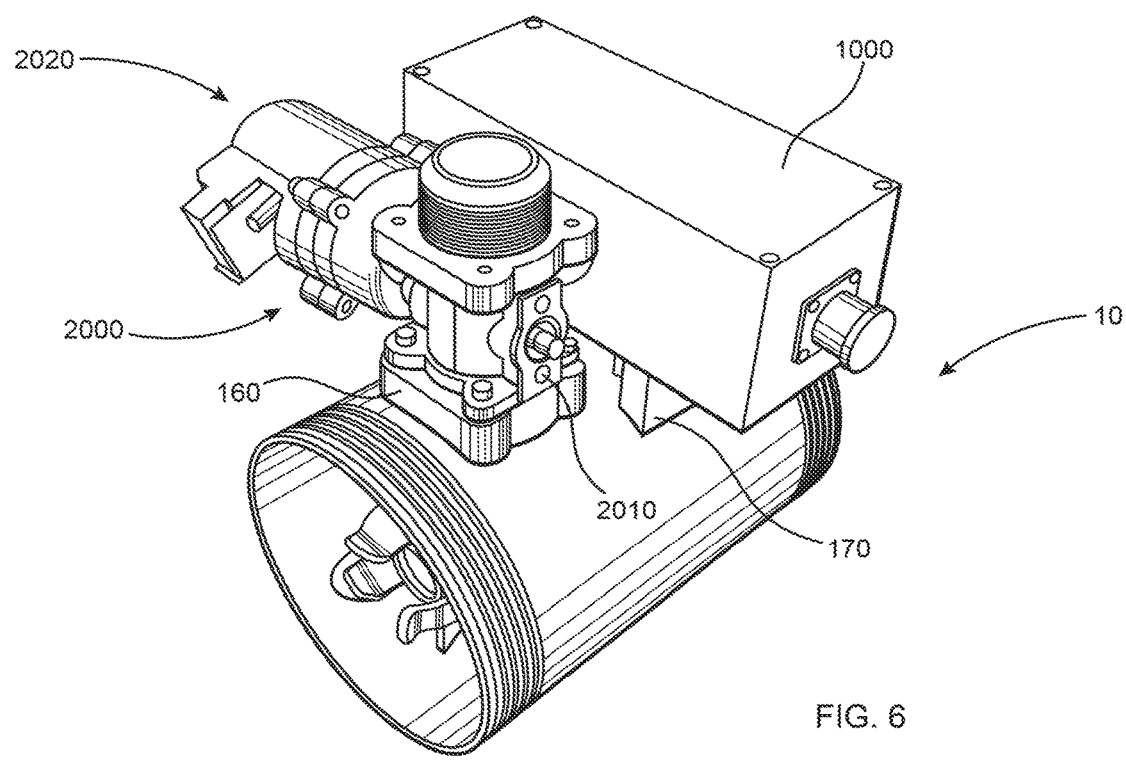
FIG. 6 is a perspective view of a mixing assembly in accordance with one embodiment of the present invention including hardware modules mounted thereto in accordance with one embodiment of the present invention.

FIG. 6 presents one embodiment of a mixing assembly 10 with a mass airflow unit 1000 and integrated throttle unit 2000 disposed thereon. In certain embodiments and uses of the present invention, it will be desirable to include a mass airflow unit 1000 and/or an integrated throttle unit 2000 with the mixer assembly 10 of the present invention. The integrated throttle unit 2000 may include a throttle 2010 for the measured dispersion of second fluid into the injector body 200. Furthermore, certain integrated throttle units 2000 include electronic throttle control 2020 which may be disposed in communication with a central computer of a vehicle, such as an Electronic Control Module ("ECM") and accomplish electronically the actuation of the throttle 2010 for precise and accurate metering of second fluid to the injector body 200.

Furthermore, a mass airflow unit 1000 may be desirable to measure the mass of air, or first fluid, travelling through the housing 100 of the mixer assembly 10. To this end, a mass airflow unit 100 may be disposed on the housing 100 with a mass airflow sensor (not depicted) disposed through the housing 100 and into fluid communication with at least the first fluid travelling therethrough. Additionally, the mass airflow unit 1000 may be disposed in electrical communication with an ECM, or at least the integrated throttle unit 2000, as part of a system for operating a bi-fuel vehicle, such as a diesel/natural gas engine. Accordingly, data collected by the mass airflow unit 1000 that is indicative of the quantity of air (first fluid) travelling through the housing 100 may be utilized by such a system to calculate and meter an optimal quantity of natural gas (second fluid) so as to create an optimal mixture of air and natural gas which may be then delivered to a combustion chamber of the engine of the vehicle.

Figure 7:
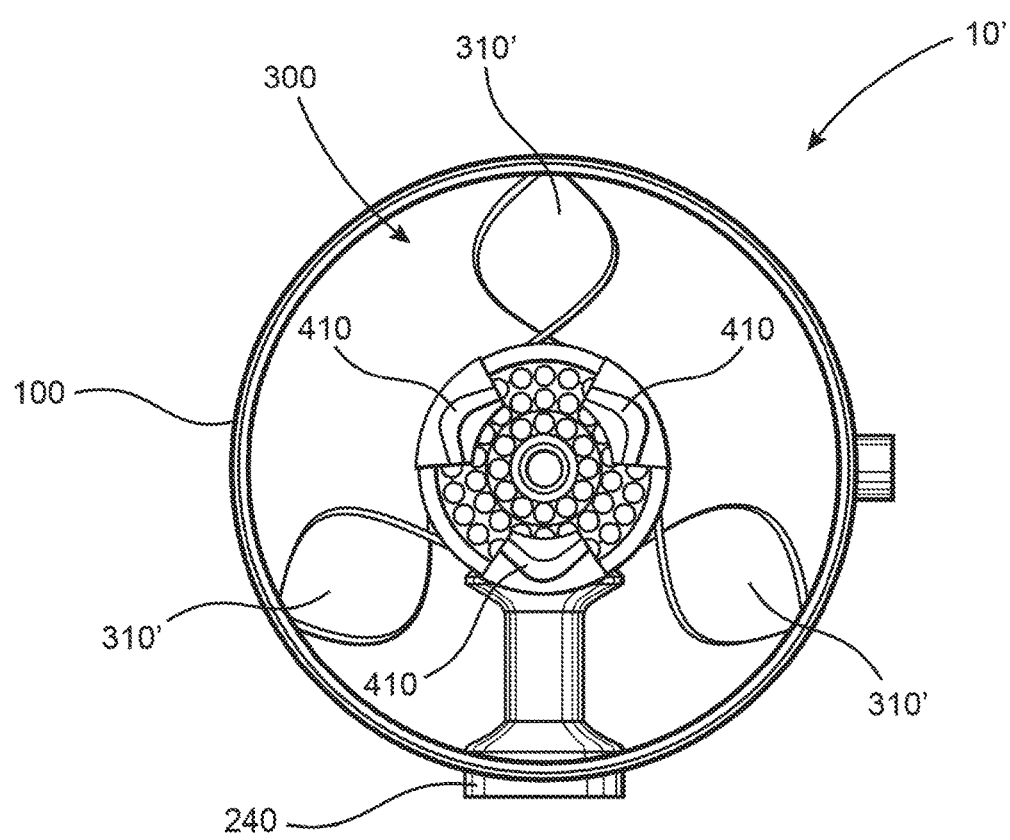
FIG. 7 is a front plan view of a mixing assembly in accordance with another embodiment of the present invention.
Figure 8:
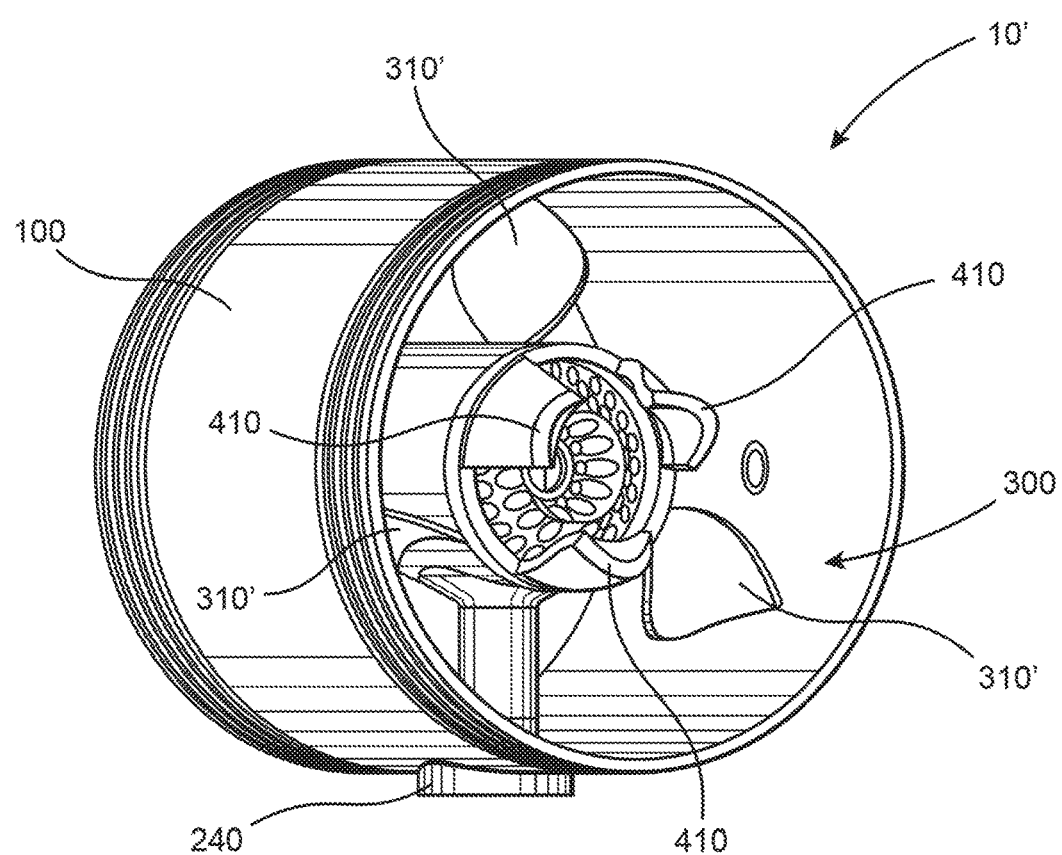
FIG. 8 is a perspective view of a mixing assembly in accordance with the embodiment of the present invention depicted in FIG. 7.

FIGS. 7 and 8 depict one embodiment of a mixing assembly 10' that is substantially similar to the embodiment of the mixing assembly 10 discussed heretofore, except that the vorticing element 300 is now comprised of angular flow controllers 310' comprising a helical or "twisted" configuration. This configuration of the angular flow controllers 310' may be described as rotating one end of a flat plane 180 degrees while restricting the other end from any movement. The configuration may also be described as a portion of a Mobius strip, or additionally, an Archimedes screw. Because of the extent of the helix, being that one end is 180 degrees rotated from the other end, all angles of attack are present between the angular flow controller 310' and the first fluid. Thus, varying amounts of drag and/or lift are induced by the travel of the first fluid past an angular flow controller 310'. As such varying amounts of local turbulence are created in the first fluid which contributes to the chaotic mixing characteristics of the present invention.

Figure 9:
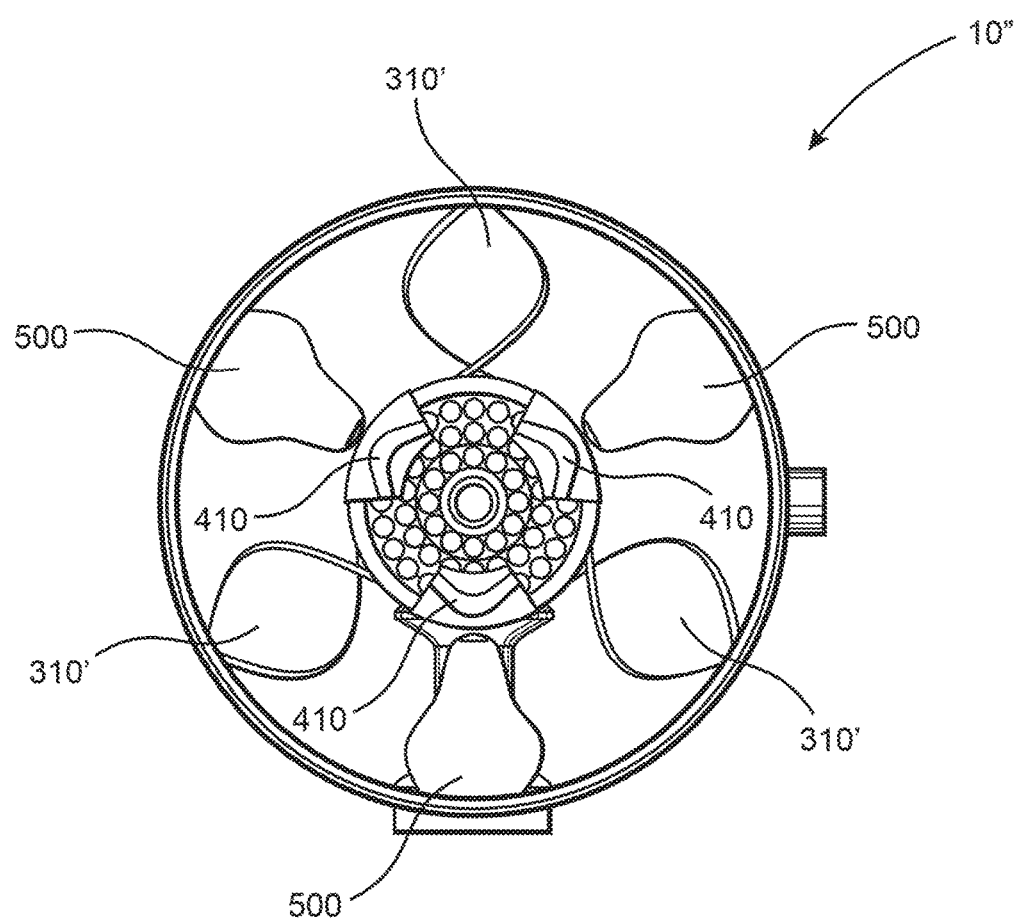
FIG. 9 is a front plan view of a mixing assembly in accordance with yet another embodiment of the present invention.
Figure 10:
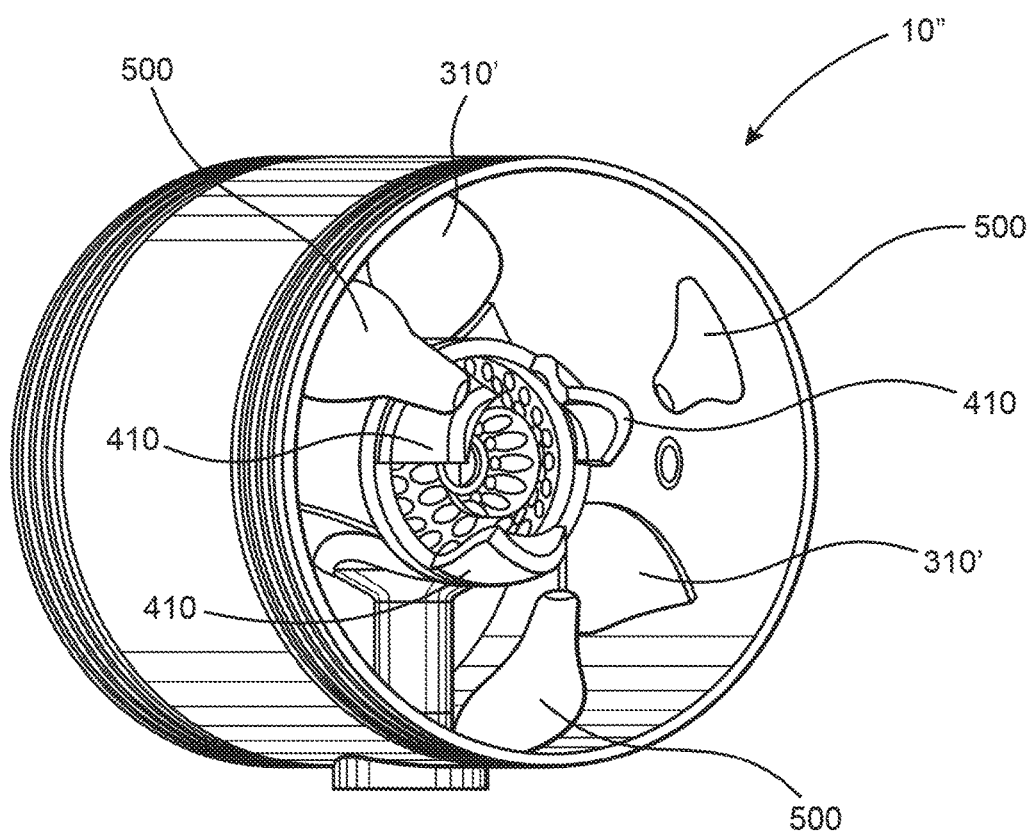
FIG. 10 is a perspective view of a mixing assembly in accordance with the embodiment of the present invention depicted in FIG. 9.

FIGS. 9 and 10 depict one embodiment of a mixing assembly 10" that is substantially similar to the mixing assembly 10' depicted in FIGS. 7 and 8, except that the embodiment of FIGS. 9 and 10 include turbulating elements 500 disposed within the housing 100 downstream of the angular flow controllers 310'. Turbulating elements 500 of the depicted configuration may serve to disrupt flow and cause eddies to form downstream, thereby creating turbulence and enhancing the chaotic mixing characteristics of the present invention. As can also be seen, the turbulating elements 500 are disposed out of phase with the angular flow controllers 310'. Specifically, the three angular flow controllers 310' may be defined as being disposed at 0, 120, and 240 degrees about the center axis of the housing, then the three turbulating elements 500 may be defined as being disposed at 60, 180, and 300 degrees about the center axis of the housing.

The relative arrangement of angular flow controllers 310' and turbulating elements 500, if appropriately and correspondingly dimensioned and configured, can create an oscillating flow generally driven by two counter-rotating vortices of first and second fluid mixes. Such a configuration may also be termed to be a fluidic oscillator, and generally enhances the chaotic mixing characteristics of the present invention.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:
1. A mixing assembly comprising:
  a housing comprising a hollow configuration and disposable to conduct a first fluid therethrough;
  an injector body disposed concentrically within said housing and disposed to deliver a second fluid to an interior of the housing;
  said injector body including at least an inlet and an outlet;
  a vorticing element disposed within a flow of the first fluid through said housing; and
  a plurality of compression elements each disposed in an annular configuration about said outlet of said injector body.

2. The assembly as recited in claim 1 wherein said vorticing element comprises a plurality of angular flow controllers disposed about said injector body.

3. The assembly as recited in claim 1 wherein said compression element comprises a plurality of radial flow controllers disposed collectively in at least partially surrounding relation to said outlet of said injector body.

4. The assembly as recited in claim 1 wherein said inlet of said injector body is disposed in fluid communication with a source of gaseous fuel.

5. The assembly as recited in claim 1 wherein the first fluid comprises air.

6. The assembly as recited in claim 1 wherein the second fluid comprises gaseous fuel.

7. A mixing assembly comprising:
  a housing comprising an open first end and open second end disposable to conduct a first fluid therethrough;
  an injector body disposed concentrically within said housing;
  said injector body comprising an inlet and an outlet;
  said outlet disposed within the flow of the first fluid;
  a plurality of angular flow controllers disposed about said injector body, in flow controlling relation to the first fluid;
  a plurality of radial flow controllers disposed in an annular configuration about said outlet, in flow controlling relation to a second fluid flowing from said outlet; and
  a plurality of turbulating elements disposed downstream of said plurality of angular flow controllers.

8. The assembly as recited in claim 7 wherein said plurality of angular flow controllers comprise a plurality of planar members disposed in a radial orientation about said injector body; said planar members rotated relative to a central axis of said housing and forming an acute angle with said central axis.

9. The assembly as recited in claim 8 wherein each of said plurality of angular flow controllers are disposed equidistantly about said injector body and each of said plurality of angular flow controllers are disposed substantially at said acute angle with said central axis.

10. The assembly as recited in claim 7 wherein said plurality of radial flow controllers comprise members with at least one surface configured to direct the second fluid toward a central axis of said housing.

11. The assembly as recited in claim 7 wherein said outlet of said injector body comprises a diffuser, said diffuser comprising a perforated configuration.

12. The assembly as recited in claim 11 wherein said diffuser comprises a main aperture and a plurality of secondary apertures disposed concentrically about said main aperture.

13. The assembly as recited in claim 11 wherein said diffuser comprises a distal conical configuration concentrically disposed about a proximal, inverted conical configuration.

14. The assembly as recited in claim 7 wherein said plurality of angular flow controllers comprise helical members.

15. The assembly as recited in claim 7 said plurality of turbulating elements are disposed out of phase with said plurality of angular flow controllers.

16. The assembly as recited in claim 7 wherein the first fluid comprises air.

17. The assembly as recited in claim 7 wherein the second fluid comprises gaseous fuel.

18. The assembly as recited in claim 7 wherein said outlet of said injector nozzle comprises a diffuser.

19. The assembly as recited in claim 18 wherein said diffuser comprises a plurality of apertures.

* * * * *